United States Patent [19]

Witzel

[11] 3,962,463

[45] June 8, 1976

[54] CHEWING GUM HAVING SURFACE IMPREGNATED, MICROENCAPSULATED FLAVOR PARTICLES

[75] Inventor: Frank Witzel, Spring Valley, N.Y.

[73] Assignee: Life Savers, Inc., New York, N.Y.

[22] Filed: Mar. 19, 1975

[21] Appl. No.: 559,850

Related U.S. Application Data

[63] Continuation-in-part of Ser. No. 240,564, April 3, 1972, abandoned.

[52] U.S. Cl. .................................................. 426/5
[51] Int. Cl.² ........................ A23G 3/30; A23G 3/00
[58] Field of Search ................................. 426/4–6

[56] References Cited
UNITED STATES PATENTS

2,886,441    5/1959    Kramer ................................. 426/3
3,205,075    9/1965    Heggie et al ......................... 426/3

*Primary Examiner*—Jeanette M. Hunter
*Attorney, Agent, or Firm*—Lawrence S. Levinson; Merle J. Smith; Burton Rodney

[57] ABSTRACT

Chewing gum having acceptable flavor but with a substantially reduced content of flavoring ingredients is obtained by impregnating or depositing solid flavor particles, such as microencapsulated flavor particles or flavors sorbed on an edible substrate, on the surface of the gum.

9 Claims, 2 Drawing Figures

CHEWING GUM HAVING SURFACE IMPREGNATED, MICROENCAPSULATED FLAVOR PARTICLES

REFERENCE TO OTHER APPLICATIONS

This application is a continuation-in-part of copending application Ser. No. 240,564, filed Apr. 3, 1972 now abandoned.

BACKGROUND OF THE INVENTION

The production of heretofore known chewing gums with acceptable flavor has required a far higher level of flavoring ingredients (10,000–15,000 ppm are commonly employed) than other food products for several reasons. First, a substantial portion of the flavoring ingredients in chewing gum is completely absorbed by the gum base and, therefore, is not available to affect the taste buds of the consumer. Second, chewing gum is retained in the mouth for substantial periods of time, for as long as 60 minutes, and consequently, must contain sufficient flavoring ingredients to maintain an acceptable taste throughout this time. Third, the chewing of gum stimulates a greater flow of saliva than does the eating of other food products, and as a result a greater amount of flavoring ingredients is required to compensate for this dilution. Finally, a conventional stick of chewing gum weighs far less than most individual food servings and so must contain a relatively higher percentage of flavoring ingredients.

OBJECTS OF THE INVENTION

It is, accordingly, an object of the present invention to provide a chewing gum having an immediate, high level of flavor and yet which contains a substantially lessened amount of flavoring ingredients. Another object of the invention is to provide a novel method for preparing a chewing gum stick having flavoring ingredients deposited on at least one surface thereof. A further object is to provide a chewing gum wherein substantially all of the flavoring ingredients are available to affect the taste buds of the consumer rather than having a substantial portion of the flavoring ingredient absorbed by the gum base. These and other objects of the present invention will be apparent from the following description.

SUMMARY OF THE INVENTION

It has now been found that chewing gum having an immediate, high level of flavor with a substantially lessened amount of flavoring ingredient is obtained by impregnating or depositing solid flavor particles, preferably microencapsulated flavor particles or flavors sorbed on an edible substrate on the surface of the gum. As will be seen hereinafter, the interior of the gum which will preferably be in the form of a stick, is substantially free of flavor particles, although, if desired, the interior of the gum may include flavoring as well. However, it will be appreciated that the solid flavor particles are deposited or impregnated on the surface of the gum which will ordinarily have a thickness ranging from about 1250 microns to about 2300 microns and usually about 1750 to about 1800 microns in a manner such that the solid particles penetrate the gum surface to a depth of at most within the range of from about 35 to about 230 microns or a penetration of at most about 10%, and preferably from about 36 to about 42 microns. Accordingly, it is apparent that the flavor particles do not penetrate the surface of the gum stick to any substantial degree and thus the interior of the gum can be said to be substantially free of flavor particles.

The solid flavor particles will be applied to the surface of the gum stick so as to provide an amount of flavor of from about 0.14% to about 0.54% and preferably from about 0.14% to about 0.45% by weight of the gum stick. In this manner, the gum will have a pleasing initial burst of flavor which will last for a substantial period of time.

Chewing gum sticks are normally flavored at a level of about 0.9% by weight. However, the flavoring is normally mixed in with the gum base and absorbed or lost in the base so that a substantial amount of the flavoring is not available to affect the taste buds of the consumer. However, in the chewing gum of the invention substantially all of the solid flavor particles are available to affect the taste buds. Thus, as seen above, the amount of flavoring employed in the gum in accordance with the present invention will be anywhere from 40 to 85% less than that employed in prior art gum to produce the same level of taste for the same period of time.

As discussed above, the gum base employed in forming the chewing gum in accordance with the present invention may optionally include a flavoring, such as a conventional liquid flavoring, for example, oils such as spearmint, peppermint, clove, cinnamon and the like, to further extend the taste of such gum.

DETAILED DESCRIPTION

Figure 1:
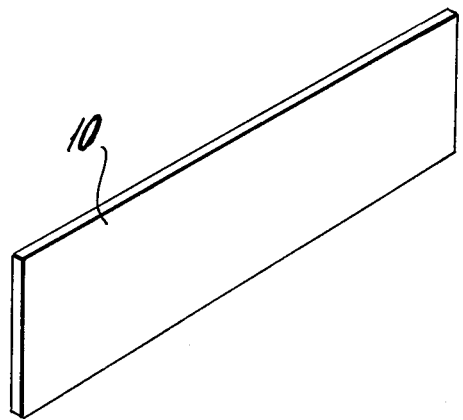
FIG. 1 is a perspective view of a stick of gum according to the present invention.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents, e.g. oil of wintergreen, oil of spearmint, oil of peppermint, licorice, fruit flavors, spice oils, etc.; or sweetening agents which may be sugars, including sucrose or dextrose, and/or artificial sweeteners. Other optional ingredients may also be present.

The water-insoluble gum base may consist of any of the various bases disclosed for example in U.S. Pat. No. 2,197,719. Typical gum base compositions are the following:

| Base I | |
|---|---|
| Ester gum | 88 |
| Rubber latex solids | 10 |
| Commercial soya bean lecithin | 2 |

| Base II | |
|---|---|
| Chicle | 30 |
| Jelutong | 60 |
| Gutta soh | 8.5 |
| Commercial soya bean lecithin | 2 |

| Base III | |
|---|---|
| Partially oxidized chicle | 98 |
| Commercial soya bean lecithin | 2 |

-continued

Base IV

| | |
|---|---|
| Jelutong (dry) | 80 |
| Gutta siak | 18 |
| Commercial soya bean lecithin | 2 |

The water phase consists of sugar or a mixture of sugars, softeners or fillers and flavoring ingredients. Typically, chewing gum may have the following percentage of ingredients:

| | |
|---|---|
| Gum base | 15–25 |
| Sucrose | 50–65 |
| Glucose | 15–25 |
| Softeners or fillers | 1–5 |
| Flavoring—a fraction of 1% and a thin coating of dusting sugar. | |

It has now been found according to the present invention that chewing gum containing on its surface tiny capsules of flavoring oil or flavors fixed on an edible substrate will release the flavor upon mastication, thereby imparting to the consumer an immediate sensation of strong, clean flavor.

According to one aspect of the present invention, the flavoring ingredient is microencapsulated in gelatin, waxes, polyethylene and the like, and printed on the surface of the gum as an aqueous slurry. The encapsulation is effected in conventional manner by blending the liquid flavoring with a concentrated aqueous solution of gelatin at a temperature below about 25°C whereby a very fine, stable emulsion is formed. The emulsion, preferably after treatment to impart moisture resistance, is spray dried while still cool, thereby producing a fine free-flowing powder each particle of which consists of a core of flavoring surrounded by a dry gelatin wall. The particles may vary in size from about 1 micron to about 100 microns, preferably from about 1 micron to about 50 microns.

In an alternative embodiment of the present invention, the solid flavor particles are formed by sorbing the flavor, such as natural essential and synthetic flavoring oils or other water immiscible flavoring, on an edible water soluble or water dispersible substrate such as gum arabic, ethyl cellulose, calcium alginate, dextrins, silica, starch, as well as water-soluble gums and polysaccharides, shellac glazes. The particles produced may be of a size similar to the microencapsulated flavors. The above flavor particles will be applied from a nonaqueous slurry of such particles, such as a stabilized orange terpenes, ethyl acetate or confectioners glaze slurry.

The gelatin microencapsulated flavoring ingredient or the flavors sorbed on an edible substrate is printed on the gum by either direct or off-set Gravure printing. Gravure cyclinders may have from about 30 to about 120 lines or cells per cm and a cell depth of from about 20 to about 230 microns. In this case, the flavoring ingredients would be printed in the form of cells varying from about 1/30 cm to about 1/120 cm in width, and from about 20 to about 230 microns in depth. Knurled cylinders may have from about 3 to about 85 lines or cells per cm and a cell depth of from about 20 to about 230 microns. In this case, the flavoring ingredients would be printed in the form of cells varying from about ⅓ cm to about 1/85 cm in width, and from about 20 to about 230 microns in depth.

The amount of flavor impregnated in the surface of the chewing gum may be controlled by the number and depth of cells, the particle size of the solid flavor particles, the concentration of flavor particles in the aqueous slurry, in the case of the microencapsulated particles, or non-aqueous slurry in the case of the fixed flavor particles, and printing on one or both sides of the gum.

Figure 2:
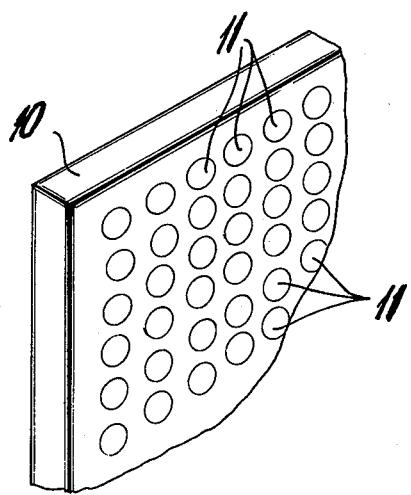
FIG. 2 is an enlarged fragment of the stick of gum of FIG. 1.

Referring to the drawings, FIG. 1 shows a stick of gum 10 according to the present invention having solid flavor particles impregnated on the surface thereof. FIG. 2 is an enlarged fragment of the stick of gum 10 of FIG. 1 showing the solid flavor particles 11. As shown in FIG. 2, the solid flavor particles 11 are arranged in parallel rows. It is to be understood, however, that any ordered or random arrangement of flavor particles is possible depending upon the manner in which the printing cyclinder is etched.

The term "sorb" or "sorbed" as used herein refers to the ability of the flavors to be retained of the edible substrate by absorption and/or adsorption.

The following examples illustrate the present invention without, however, limiting the same thereto.

EXAMPLE 1

A peppermint flavor chewing gum is prepared from the following ingredients:

| | | |
|---|---|---|
| Gum base | 21.6 | parts by weight |
| Corn Syrup, 44° Be | 18.0 | " |
| Powdered Sugar | 60.4 | " |
| Lecithin | 0.2 | " |

The melted gum base (temperature 2502°F) is placed in a standard dough mixer equipped with sigma blades. The corn syrup and lecithin are added and mixed for 5 minutes. Powdered sugar is added and mixed another 5 minutes. The gum is discharged from the kettle, cut into 25 lb. loaves and allowed to cool to 90°–120°F. It is then rolled to a thickness of 0.178 cm on a standard Gimpel machine and scored into strips 7.26 cm wide and 41.9 cm long. After cooling 12–18 hours, the gum is ready for the printing operation.

The gum is then fed into a printing machine equipped with gravure cylinders and printed with an aqueous slurry of microencapsulated flavor particles on both top and bottom. The aqueous flavor slurry has an actual peppermint oil content of 15.6%. The printing operation is conducted on a modified breaking machine. The machine automatically discharges from a cartridge slabs of gum 7.26 cm wide and 41.9 cm long at a speed of 270 slabs per minute. The gum is fed between two gravure printing cylinders set at approximately 0.127 cm for gum rolled to a thickness of 0.178 cm. Each cylinder has about 69 lines or cells/cm. The top cylinder has a cell depth of from 38–42 microns and a cell wall (distance between parallel cells) of 25 microns. The bottom cylinder has a cell depth of from 36–38 microns and a cell wall of 20–25 microns. The flavor capsules containing 80% flavor are thus impregnated onto the gum. After passing through the cylinders, the gum stick is about 0.142 cm in thickness and contains about 0.14% by weight flavor deposited on the surfaces thereon; the flavor capsules penetrate one surface to 38–42 microns and the other surface to 36–38 microns.

EXAMPLE 2

Following the procedure of Example 1, a lemon flavor chewing gum is prepared from the following formulation:

| | | |
|---|---|---|
| Gum Base (containing no CaCo₃) | 21.6 | parts |
| Corn Syrup, 44° Be | 18.0 | " |
| Powdered Sugar | 59.4 | " |
| Citric Acid (powdered) | 1.0 | " |
| Lecithin | 0.2 | " |

The aqueous slurry of microencapsulated flavor particles contains 15.7% of lemon oil so that the final gum is 0.142 cm thick and contains about 0.14% by weight flavor deposited on the surfaces thereof; the flavor capsules penetrate one surface of the gum to 38–42 microns and the other surface to 36–38 microns.

EXAMPLE 3

Following the procedure of Example 1, spearmint flavor chewing gum is prepared from the following formulation:

| | | |
|---|---|---|
| Gum Base | 21.6 | parts |
| Corn Syrup, 44° Be | 20.0 | " |
| Powdered Sugar | 58.4 | " |
| Lecithin | 0.2 | " |

The aqueous slurry of microencapsulated flavor particles contains 16.1% of spearmint oil so that the final gum is 0.142 cm thick and contains about 0.14% by weight flavor deposited on the surfaces thereof; the flavor capsules penetrate one surface of the gum to 38–42 microns and the other surface to 36–38 microns.

EXAMPLE 4

Following the procedure of Example 3, a slurry of flavor particles comprising 30% spearmint oil sorbed on gum arabic slurried at a level of 50% in confectioners glaze is employed to form a spearmint flavor chewing gum 0.142 cm thick containing about 45% by weight flavor deposited on the surfaces thereof; the flavor particles penetrate one surface of the gum to 38–42 microns and the other surface to 36–38 microns.

What is claimed is:

1. A chewing gum stick having a thickness within the range of from about 1250 to about 2300 microns and having solid flavor particles printed on at least one surface thereof, said flavor particles penetrating the surface thereof to a depth of within the range of from about 35 to about 230 microns, the interior of the stick being substantially free of flavor particles, said flavor particles providing an amount of flavor within the range of from about 0.14 to about 0.54% by weight of said stick.

2. A chewing gum stick according to claim 1 wherein the solid flavor particles are microencapsulated.

3. A chewing gum stick according to claim 1 wherein the microencapsulated flavor particles have a size of from about 1 to about 100 microns.

4. A chewing gum stick according to claim 3 wherein the microencapsulated flavor particles have a size of from about 1 to about 50 microns.

5. A chewing gum stick according to claim 1 wherein the solid flavor particles comprise flavors sorbed on an edible substrate.

6. A chewing gum stick according to claim 1 having solid flavor particles impregnated on both the top and the bottom surface of the chewing gum stick.

7. A chewing gum stick according to claim 1 wherein the solid flavor particles penetrate the surface thereof to at most 35 to about 45 microns.

8. A method for preparing a chewing gum stick according to claim 1, which comprises rolling and scoring a mass of chewing gum composition to form sticks of gum, feeding a stick of chewing gum between two cylinders, at least one of the cylinders comprising a printing cylinder having from about 3 to about 120 lines/cm and a cell depth of from about 20 to about 230 microns, said printing cylinder applying a slurry of solid flavor particles to at least one surface of the chewing gum stick, said flavor particles providing an amount of flavor within the range of from about 0.14 to about 1.54% by weight of said stick.

9. The method as defined in claim 8 wherein the slurry of solid flavor particles comprise an aqueous slurry of microencapsulated flavor particles.

* * * * *

UNITED STATES PATENT AND TRADEMARK OFFICE
CERTIFICATE OF CORRECTION

PATENT NO. : 3,962,463
DATED : June 8, 1976
INVENTOR(S) : Frank Witzel

It is certified that error appears in the above—identified patent and that said Letters Patent are hereby corrected as shown below:

Column 5, line 8, "44° Be" should read --44° Be'--.
Column 5, line 26, "44° Be" should read --44° Be'--.
Column 6, line 41, "1.54%" should read --0.54%--.

Signed and Sealed this

Fifth Day of October 1976

[SEAL]

Attest:

RUTH C. MASON
Attesting Officer

C. MARSHALL DANN
Commissioner of Patents and Trademarks